United States Patent [19]

Yoshino

[11] 4,084,894

[45] Apr. 18, 1978

[54] ARRAY OF OPTICAL PROJECTION DEVICES

[75] Inventor: Masaki Yoshino, Ebina, Japan

[73] Assignee: Fuji Xerox Co., Ltd., Tokyo, Japan

[21] Appl. No.: 446,796

[22] Filed: Feb. 28, 1974

[30] Foreign Application Priority Data

Mar. 24, 1973 Japan .................................. 48-33097

[51] Int. Cl.² ...................... G03B 21/26; G02B 27/00; G02B 17/00

[52] U.S. Cl. ..................................... 353/34; 350/167; 350/202

[58] Field of Search ...................... 353/30, 36, 37, 34, 353/32; 355/50, 51; 350/202, 203, 213, 167

[56] References Cited

U.S. PATENT DOCUMENTS

| | | | |
|---|---|---|---|
| 3,014,403 | 12/1961 | Alofs | 353/98 |
| 3,453,043 | 7/1969 | Anthony | 353/98 |
| 3,584,950 | 6/1971 | Gundlach | 355/50 |
| 3,606,535 | 9/1971 | Koizumi | 355/51 |
| 3,741,646 | 6/1973 | Knechtel et al. | 355/50 |
| 3,836,249 | 9/1974 | Weber | 355/51 |

OTHER PUBLICATIONS

IBM Technical Disclosure, Short Length Optical System, R. J. Wohl, vol. 13, No. 10, Mar. 1971, p. 2947.

*Primary Examiner*—Steven L. Stephan
*Attorney, Agent, or Firm*—Gerald J. Ferguson, Jr.; Joseph J. Baker

[57] ABSTRACT

In an array of optical image projection devices where each image projection device projects a portion of an object image onto a surface, the improvement of forming the entire object image on the surface without overlapping of the image portions where each lens system comprises a lens for projecting its corresponding portion of the object image; first reflecting means for reflecting the image portion projected by the lens back through the lens; further reflecting means for projecting the image portion projected back through the lens onto the surface so that all of the image portions may be merged into a single image on the surface.

3 Claims, 8 Drawing Figures

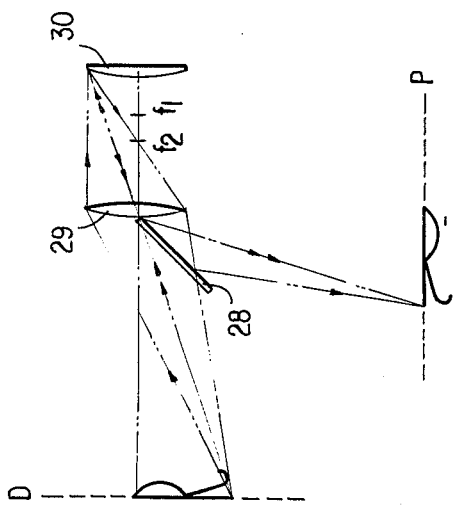
FIG. 2 (PRIOR ART)
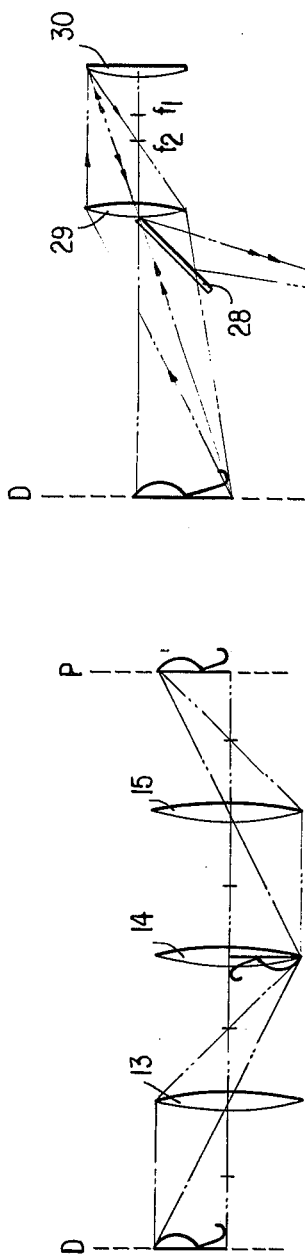
FIG. 3 (PRIOR ART)
FIG. 5
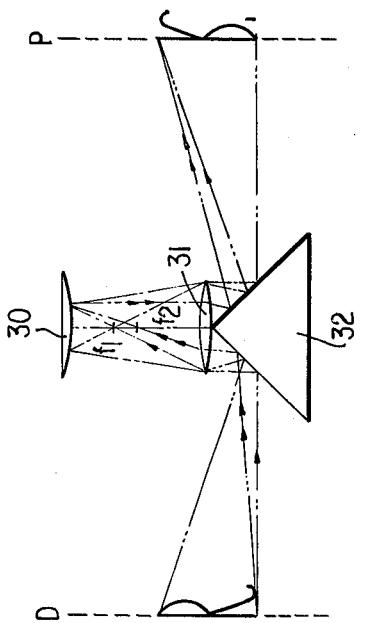
FIG. 4
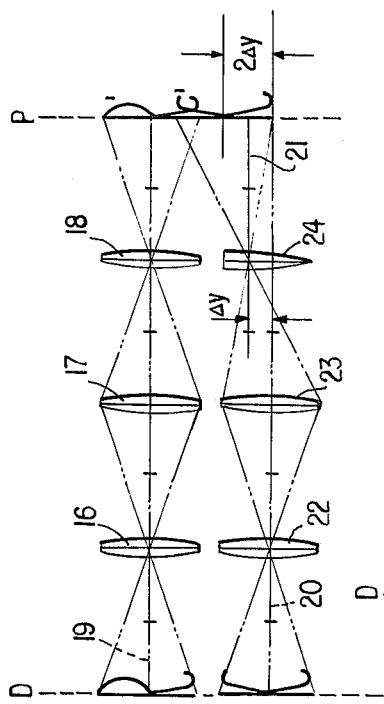
FIG. 6

ARRAY OF OPTICAL PROJECTION DEVICES

BACKGROUND OF THE INVENTION

1. Field of the Invention

The present invention relates to an optical device, more specifically, to an array of optical image projection devices where each image projection device projects a portion of an object image onto a surface.

2. Discussion of the Prior Art

A known optical image projection device projects an original image on a sheet of paper or the like through a single lens or a single lens system comprising a plurality of lenses combined into one entity. Such optical systems have only one optical axis and a number of defects are inherent therein.

First of all, the intensity of illumination of the plane of an image decreases according to the distance thereof from the optical axis. Second, the total length of the optical axis of an optical system tends to be too long in order to insure that all the image of an original object matter is properly projected. This is due to the difficulty of providing conventional lenses having a large image viewing angle. Third, the luminance of a projected image is substantially decreased compared with that of the plane of original image matter.

There are also available optical image projection devices devoid of the defects set forth above. These devices employ an array of optical projection devices where each optical image projection device has its own optical axis. Such an array of optical devices may also be known as an aggregated optical projection device.

Referring to FIG. 1, there is shown a prior art array of optical image projection devices where each image projection device comprises a single lens system such as the system comprising lenses 1, 2 and 3. Each image projection device projects a portion of the letter R (see FIG. 1) from sheet D onto sheet P, the portions being hopefully, properly joined or merged on sheet P to form the image of the letter R. Of course, if the portions are not properly merged, they might overlap thereby introducing distortion into the projected image.

The images of an original object matter obtained through the respective lens systems of the above optical image projection device array must be regular, vertical and actual images. One known optical image projection device for effecting this comprises three convex lenses 13, 14 and 15 as shown in FIG. 2 where the system of FIG. 2 may correspond to one of the lens systems of FIG. 1. In the system of FIG. 2, an inverted actual image of a letter R on the surface of a sheet D is projected onto the main plane of convex lens 14 (No. 2) through convex lens 13 (No. 1). The rays of light are then returned in the direction of the optical axis through convex lens 14 and an inverted actual image of the inverted actual image on the main plane of convex lens 14 is produced on the surface of sheet P through convex lens 15 (No. 3) thus obtaining a regular vertical image R' of the original letter R on the surface of sheet P. A regular image can thus be obtained in the orthogonal directions of x and y with respect to the optical axis of the lenses. It is also known to select a curvature of the x direction which is different from that of y, thus obtaining a regular image of the object matter in the x direction and an inverted image thereof in y direction.

The optical image projection device array set forth above is capable of making the total length of the optical axes uniform and equal, irrespective of the size of the object matter and is capable of reducing the total length of the optical axis considerably, compared with the before-mentioned conventional single lens optical system. Further, a high level of illumination intensity can be made available on the image plane. However, in spite of the foregoing advantages conventional optical image projection device arrays are defective in that overlapping or improper merging of sectional images tends to occur.

In order to illustrate in more detail the problems relating to the array of FIG. 1, reference should also be made to FIG. 3. The optical axes 10, 11 and 12 of the lens systems shown in FIG. 1 each have to be a single axis, parallel to one another. Further, the main plane of each lens, for instance, the main planes 16, 17 and 18 of respective lenses shown in FIG. 3, has to be parallel to the planes of sheets D and P. It is especially quite important that each one of the above-mentioned optical axes be a single entity and parallel to the other optical axes. Deviation of an optical axis can result from the susceptiveness of the optical axis of each lens system to deviate from the center of the lens. The deviation of the image on plane P resulting from absence of axis parallelism, is several times the deviation $\Delta y$ (see FIG. 3) of the optical axis. As can be seen in FIG. 3, it may be $2\Delta y$ and result in improper image overlapping. The deviation $\Delta y$ may be cumulative and comprise the deviation $\Delta y$ of the optical axis of lens 22 and that of lens 24.

SUMMARY OF THE INVENTION

A primary object of the present invention is the provision of an improved image projection device array for minimizing the improper merging of sectional images by such an array.

A further object of the present invention is the provision of an array of the above type which eliminates deviation of the optical axes in the array to thereby readily obtain a smoothly merged projection image.

Briefly, the present invention features, inter alia, the combination of lenses 22 and 24 of FIG. 3 into a single lens so that deviation of the optical axis is eliminated.

Further objects and advantages of the invention will become apparent after a reading of the following specification and claims taken with the drawing.

BRIEF DESCRIPTION OF THE DRAWING

FIG. 2 is a schematic drawing illustrating optical focusing by a conventional optical image projection device array.

FIG. 3 is a schematic drawing illustrating optical focusing by a conventional optical image projection device array to explain the image deviation inherent therein.

FIG. 4 is a schematic drawing of an illustrative embodiment of the invention.

FIG. 5 is a schematic drawing of another illustrative embodiment of the invention.

FIG. 6 is a schematic drawing of still another illustrative embodiment of the invention.

DETAILED DESCRIPTION OF PREFERRED EMBODIMENTS OF THE INVENTION

Figure 1:
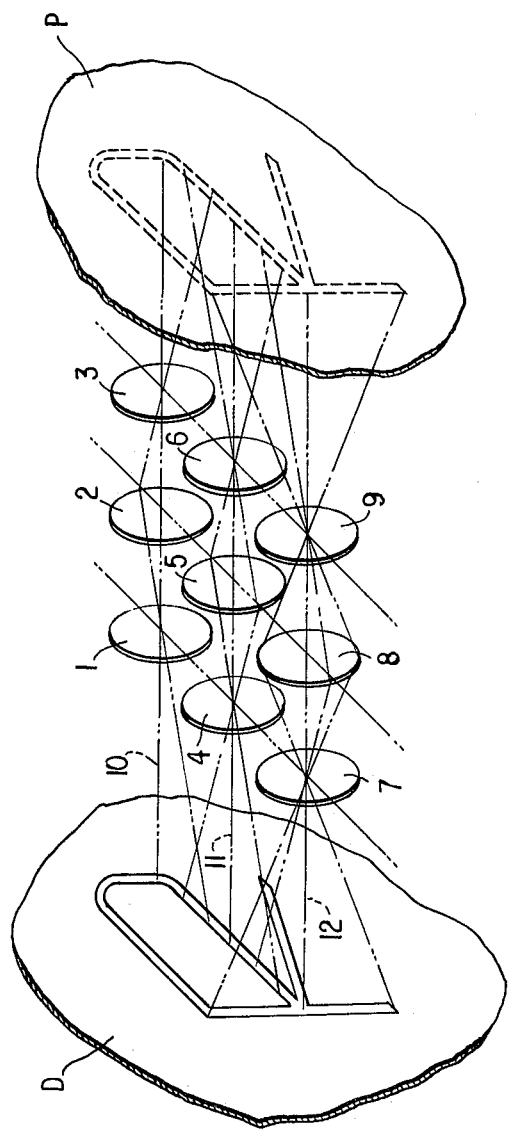
FIG. 1 is a perspective view of a conventional, prior art optical image projection device array.

Referring to FIG. 4, an inverted image of a letter R on an original plane is projected onto the main plane of a lens 26 (No. 2) through a lens 25 (No. 1). Lens 26 may be either a mirror lens or a concave lens. The focal points of lenses 25 and 26 are respectively denoted at $f_1$ and $f_2$. The rays of light of the image may be focused on a mirror at the main plain of lens 26 and then refractively reflected in the direction of the optical axis. They are then focused into a regular image on the original plane D through lens 25. An image R' is also focused onto a plane P by semi-transparent mirror 27 inserted between plane D and lens 25.

Referring to FIG. 5, there is shown another embodiment of the invention where a reflector 28 is employed instead of the semi-transparent mirror 27 employed in the embodiment of FIG. 4. Reflector 28 is so positioned that it interrupts one half of the light in front of lens 29 (No. 1). Lens 29 corresponds to lens 25 of FIG. 4. The forward path (through the upper half of lens 29) and backward path (through the lower half of lens 29) of the rays passing through and refracted by lens 29 are so directed that an inverted image of the inverted image focused in mirror lens 30 (No. 2, which corresponds to mirror lens 26 of FIG. 4) is focused on the plane P as indicated in FIG. 5.

The two optical systems shown in FIGS. 4 and 5 are suitable for duplicators where an image of a document is projected onto, for example, a photosensitive substance or a photoelectric element and then the image is transcribed to obtain a correctly readable image.

FIG. 6 shows still another embodiment of the invention where a right angle reflector 32 is symmetrically positioned in front of a lens 31 (No. 1) with the right angle of the reflector pointing at the lens. Lens 31 corresponds to lens 25 of FIG. 4 and mirror lens 30 of FIG. 6 corresponds to mirror lens 26 of FIG. 4. Reflector 32 may be a right-angled trigonal prism-shaped glass bar given a mirror surface treatment. In this case, it is desirable that the right-angled edge lines of the reflector be set on the optical axes of the lens systems, respectively. Image focusing in this embodiment is the same in principle as in the embodiments of FIGS. 4 and 5; however, in comparing the letter R on plane D with an image R' on plane P of FIG. 6, it can be seen that a regular image is obtained in the direction parallel to the edges of the reflector. In other words, the regular image is obtained in the direction of image portion joining, and an inverted image is obtained in the direction orthogonal thereto as can be further seen in FIG. 8.

Figure 7:
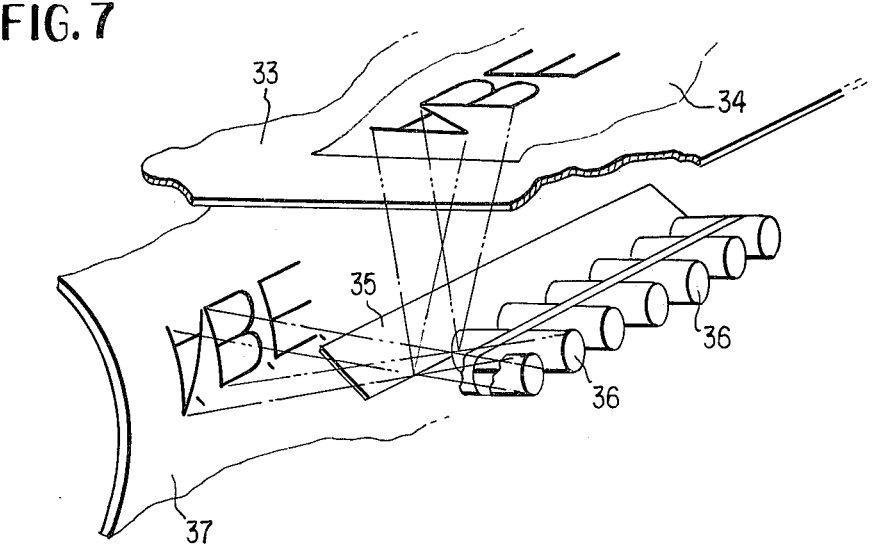
FIG. 7 is a perspective view of the optical system of FIG. 5 when employed in a duplicator.

An optical system such as this is particularly suitable for duplicators where an image of a document is projected onto, for instance, a photosensitive paper or a photoelectric element, there being no further need for transcription to obtain a correctly readable image. FIG. 7 illustrates how the optical system of FIG. 5 may be used in a duplicator. A glass plate 33 is provided upon which an original 34 may be placed. Reflector 35 corresponds to reflector 28 and lenses 29 and 30 are provided at the respective ends of container 36. The image is formed as indicated on photosensitive drum 37.

Figure 8:
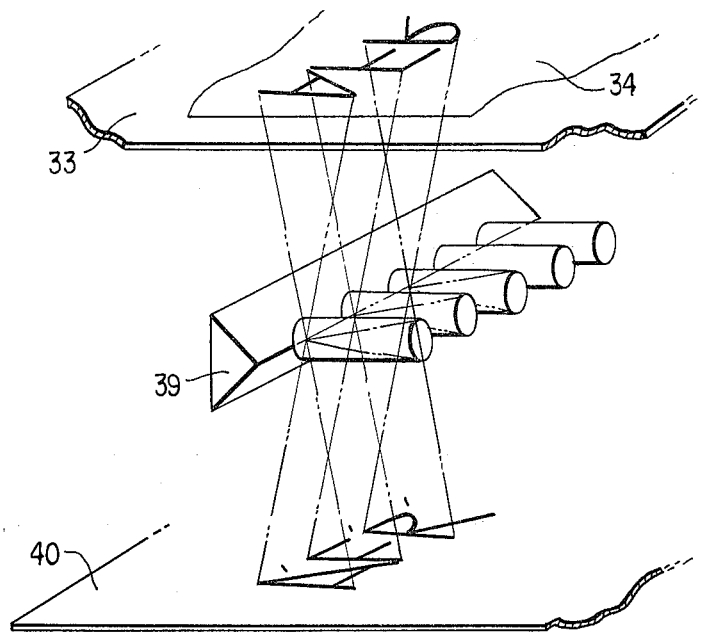
FIG. 8 is a perspective view of the optical system of FIG. 6 when employed in a duplicator.

FIG. 8 illustrates how the optical system of FIG. 6 may be used in a duplicator. Reflector 39 corresponds to reflector 32 and lenses 30 and 31 are provided at the respective ends of the containers disposed adjacent reflector 39. The image is formed as indicated on photosensitive paper 40.

As described, each lens system of the lens system array of the present invention comprises a reflective optical system such as a mirror lens or a concave mirror disposed on the same optical axis as that of and parallel to a lens (No. 1) and one or more reflectors interposed between (a) the original object and the lens or (b) the lens and the surface upon which the image is projected. With this array the hereinbefore described disadvantages of the prior art are eliminated. Thus, the beforementioned deviation of the optical axis inherent in a conventional arrays of optical image projection devices can be completely eliminated, thus making it practical to obtain a clear-cut image, i.e., an image completely free from an irregular overlapping.

What is claimed is:

1. An array of optical image projection devices where each image projection device projects a portion of an object image onto a surface to form the entire object image on the surface without overlapping of the image portions where each image projection device consists of a double convex lens for projecting its corresponding portion of the object image;

a reflecting focusing means for reflectively focusing the image portion projected by said lens back through said lens; and further reflecting means for projecting the image portion projected back through said lens onto said surface so that all of the image portions may be merged into a single image on the surface, said further reflecting means comprises a semi-transparent reflector angularly disposed with respect to the optical axis of said double convex lens between said double convex lens and said object image so that the light rays pass from said object through said semi-transparent reflector and double convex lens to said refractive reflecting means where an inverted, actual image of said object is formed, said light rays being reflected back through said lens and again reflected from said semi-transparent reflector onto said surface where a regular, actual image of said object is formed.

2. An array of optical image projection devices where each image projection device projects a portion of an object image onto a surface to form the entire object image on the surface without overlapping of the image portions where each image projection device consists of a double convex lens for projecting its corresponding portion of the object image;

a reflecting focusing means for reflectively focusing the image portion projected by said lens back through said lens; and further reflecting means for projecting the image portion projected back through said lens onto said surface so that all of the image portions my be merged into a single image on the surface, said further reflecting means comprises a reflector disposed in the path of the light rays from said object image so that approximately half of said light rays are prevented from initially passing through said double convex lens, said reflector being so angularly disposed with respect to the optical axis of said double convex lens that the remaining half of said light rays are projected by said double convex lens into said refractive reflecting means where an inverted, actual image of said object is formed, said light rays being reflected back through said double convex lens into said reflector where they are reflected on said surface where a regular, actual image of said object is formed.

3. The improvement as in claim 2 where each said reflector is a portion of an integral reflector which extends the entire length of said array.

* * * * *